(12) United States Patent
Gidla et al.

(10) Patent No.: US 10,329,998 B2
(45) Date of Patent: Jun. 25, 2019

(54) METHOD OF SUPPORTING CHARGE AIR TUBES AND MANAGING THERMAL EXPANSION USING A WEAR SLEEVE

(71) Applicant: Cummins, Inc., Columbus, IN (US)

(72) Inventors: Stephen Sunadh Gidla, Greenwood, IN (US); David P. Genter, Columbus, IN (US); Wesley Ann Loxley, Columbus, IN (US)

(73) Assignee: Cummins Inc., Columbus, IN (US)

( * ) Notice: Subject to any disclaimer, the term of this patent is extended or adjusted under 35 U.S.C. 154(b) by 65 days.

(21) Appl. No.: 15/522,565

(22) PCT Filed: Oct. 19, 2015

(86) PCT No.: PCT/US2015/056183
§ 371 (c)(1),
(2) Date: Apr. 27, 2017

(87) PCT Pub. No.: WO2016/073174
PCT Pub. Date: May 12, 2016

(65) Prior Publication Data
US 2018/0016966 A1 Jan. 18, 2018

Related U.S. Application Data

(60) Provisional application No. 62/074,363, filed on Nov. 3, 2014.

(51) Int. Cl.
*F16L 3/223* (2006.01)
*F02B 29/04* (2006.01)
(Continued)

(52) U.S. Cl.
CPC .......... *F02B 29/0406* (2013.01); *F02B 29/04* (2013.01); *F02M 35/10* (2013.01);
(Continued)

(58) Field of Classification Search
CPC ......... F02B 29/0406; F02B 29/04; F16L 3/04; F16L 3/18; F02M 35/10; F02M 35/10078;
(Continued)

(56) References Cited

U.S. PATENT DOCUMENTS 2,790,614 A 4/1957 Miller
3,565,374 A 2/1971 Jones
(Continued)

FOREIGN PATENT DOCUMENTS

DE 10 2011 087 001 5/2013

OTHER PUBLICATIONS

International Search Report and Written Opinion issued for PCT/US2015/056183, dated Jan. 19, 2016, 9 pages.

*Primary Examiner* — Patrick D Maines
*Assistant Examiner* — Edward Bushard
(74) *Attorney, Agent, or Firm* — Foley & Lardner LLP

(57) ABSTRACT

An engine assembly and methods of supporting components of an engine assembly. An internal combustion engine includes an intake port. A charge air cooler is coupled to the intake port. A turbocharger including a charge air output port is fluidly coupled to the charge air cooler. A charge air tube is coupled to the charge air output port of the turbocharger. The charge air tube fluidly couples the turbocharger to the charge air cooler for transfer of compressed charge air from the turbocharger to the intake port of the internal combustion engine. A charge air tube support assembly is coupled to the charge air tube. The charge air tube support assembly is configured to allow axial displacement of the charge air tube along an axis of the charge air tube extending from the output port of the turbocharger to the charge air cooler in
(Continued)

response to thermal expansion of the charge air tube. The charge air tube support assembly comprises a wear sleeve and a clamp.

25 Claims, 7 Drawing Sheets

(51) Int. Cl.
  *F02M 35/10* (2006.01)
  *F02M 35/112* (2006.01)
(52) U.S. Cl.
  CPC *F02M 35/10078* (2013.01); *F02M 35/10098* (2013.01); *F02M 35/10321* (2013.01); *F02M 35/10327* (2013.01); *F02M 35/10354* (2013.01); *F02M 35/112* (2013.01); *F16L 3/2235* (2013.01); *Y02T 10/146* (2013.01)
(58) Field of Classification Search
  CPC ....... F02M 35/10098; F02M 35/10321; F02M 35/10327; F02M 35/10354; F02M 35/112
  USPC .......................................................... 60/599
  See application file for complete search history.

(56) References Cited

U.S. PATENT DOCUMENTS

| | | | | |
|---|---|---|---|---|
| 3,848,839 | A | * | 11/1974 | Tillman ............... F16L 3/04 248/62 |
| 4,006,874 | A | | 2/1977 | McGee |
| 4,262,869 | A | | 4/1981 | Menshen |
| 4,356,116 | A | * | 10/1982 | Beers ................ C08G 77/34 277/944 |
| 4,393,998 | A | | 7/1983 | Allen et al. |
| 4,929,478 | A | | 5/1990 | Conaghan et al. |
| 4,971,268 | A | * | 11/1990 | Dobrowski ........... B64D 37/32 244/135 R |
| 5,310,224 | A | | 5/1994 | Tenglund |
| 6,182,804 | B1 | * | 2/2001 | Lam ................ F16D 69/026 188/251 A |
| 6,186,452 | B1 | | 2/2001 | Zearbaugh et al. |
| 8,061,135 | B2 | | 11/2011 | Rutherford |
| 8,220,498 | B2 | | 7/2012 | Van Hooren et al. |
| 2005/0279892 | A1 | | 12/2005 | Kovac et al. |
| 2008/0184704 | A1 | | 8/2008 | Bock et al. |
| 2013/0048826 | A1 | | 2/2013 | Go |

* cited by examiner

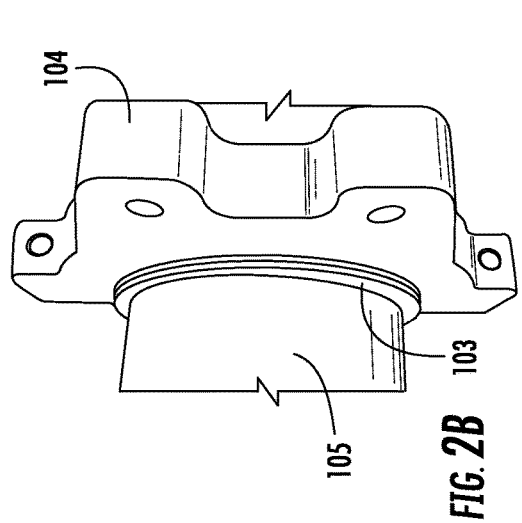
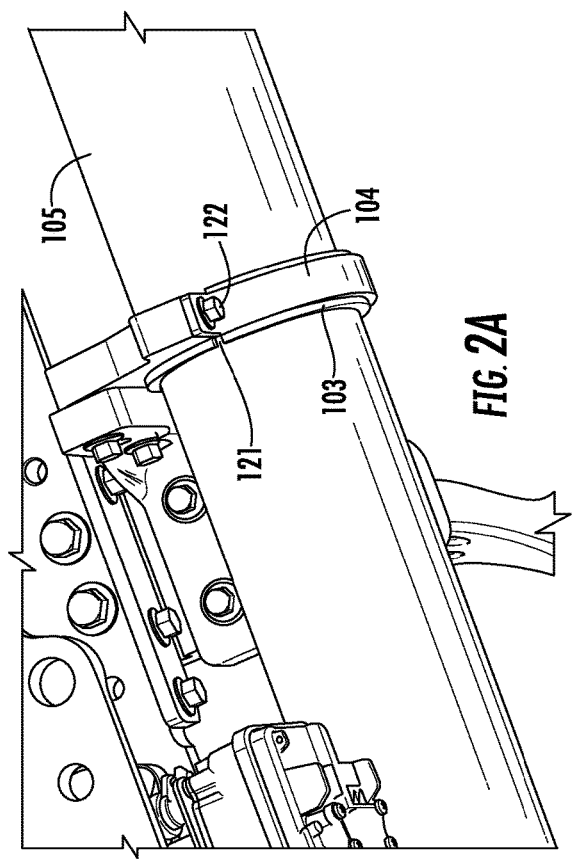
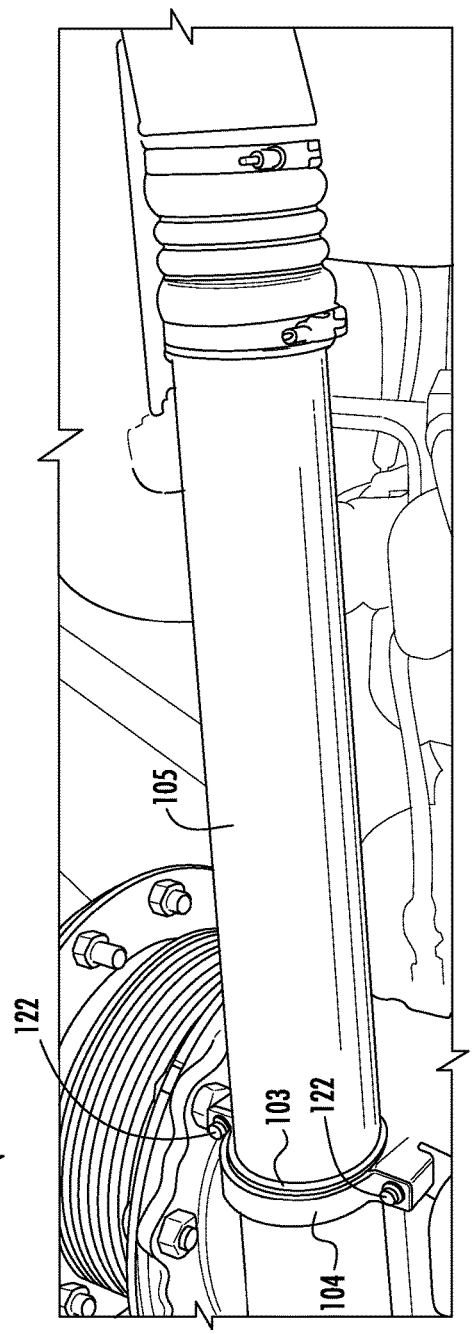
FIG. 2A
FIG. 2B
FIG. 2C

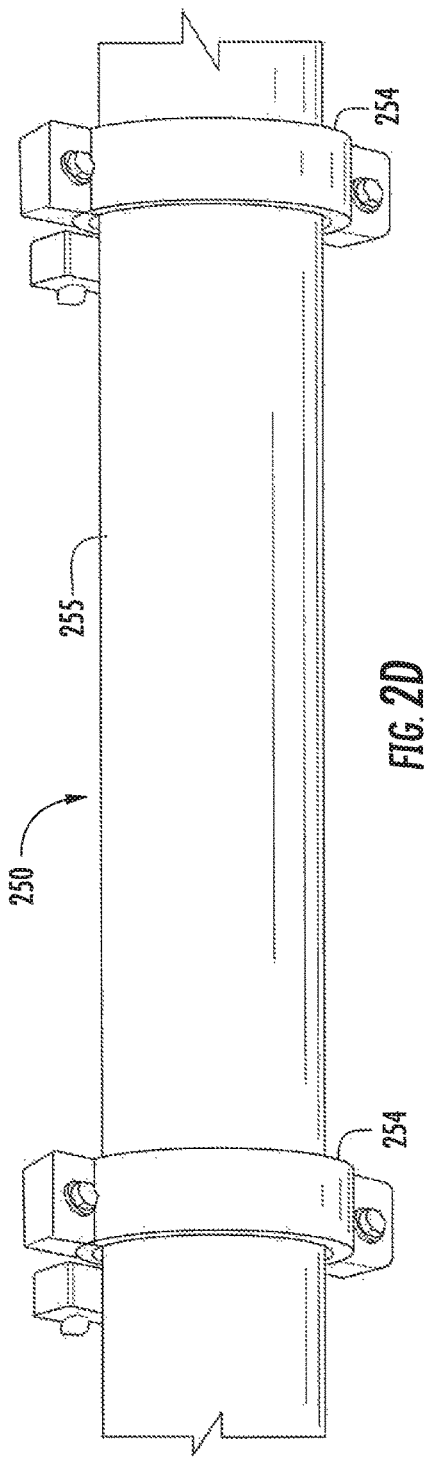
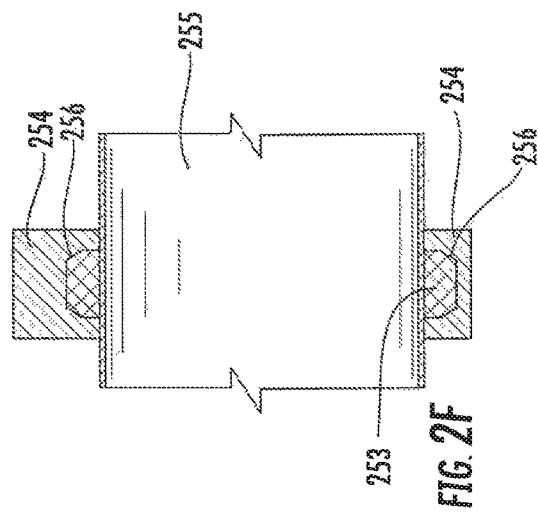
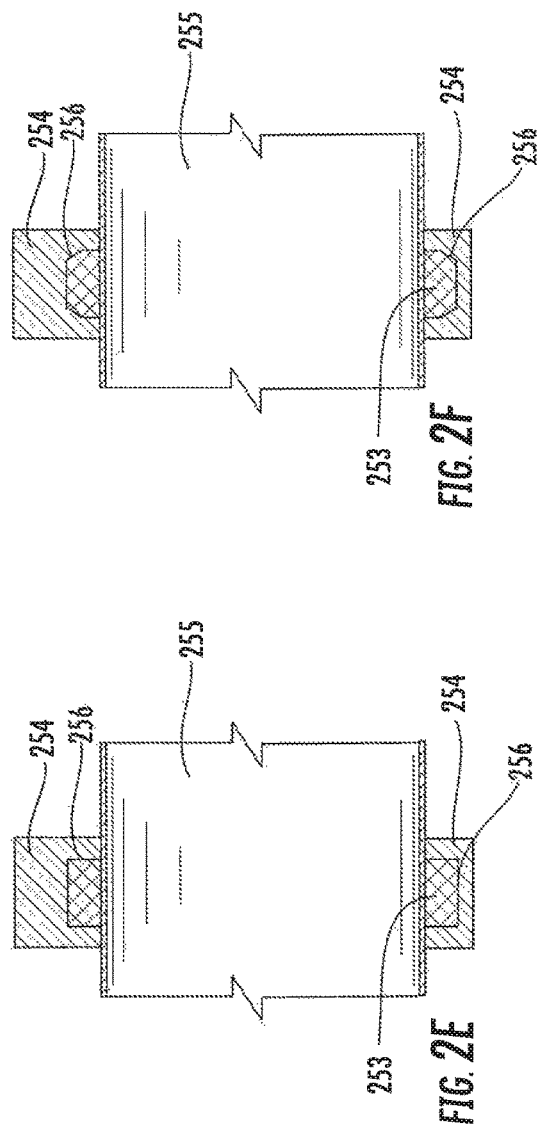

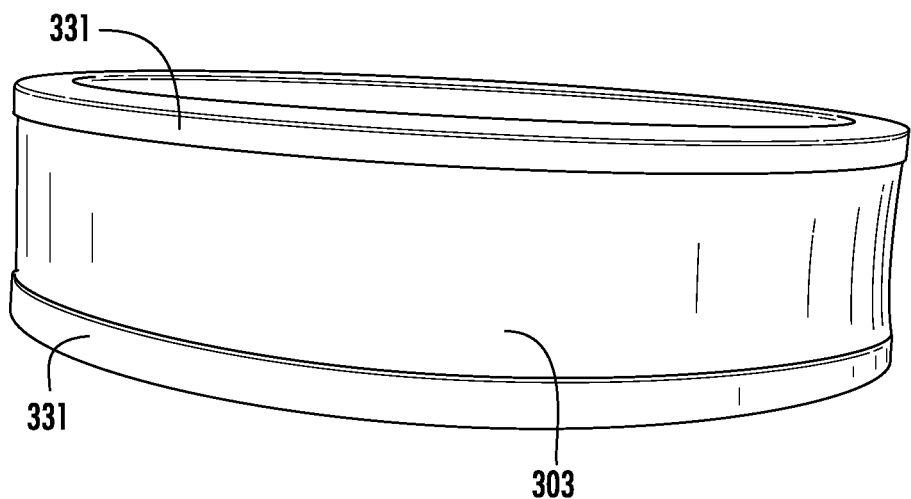
FIG. 3A
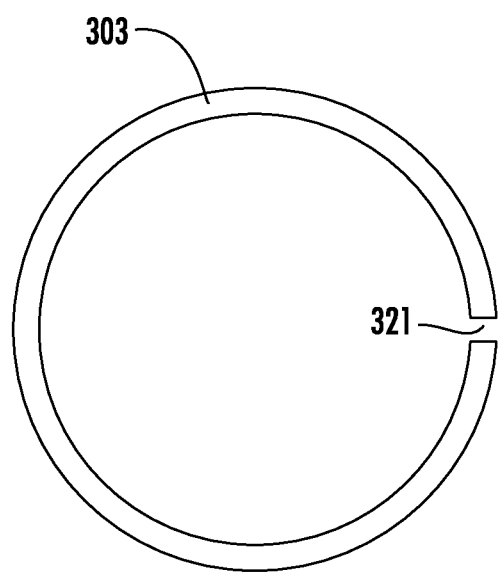 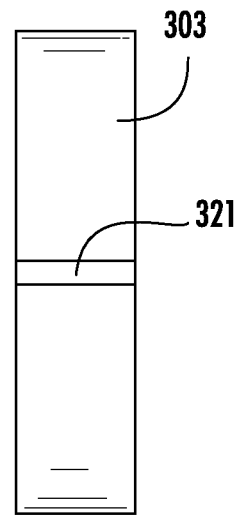
FIG. 3B FIG. 3C

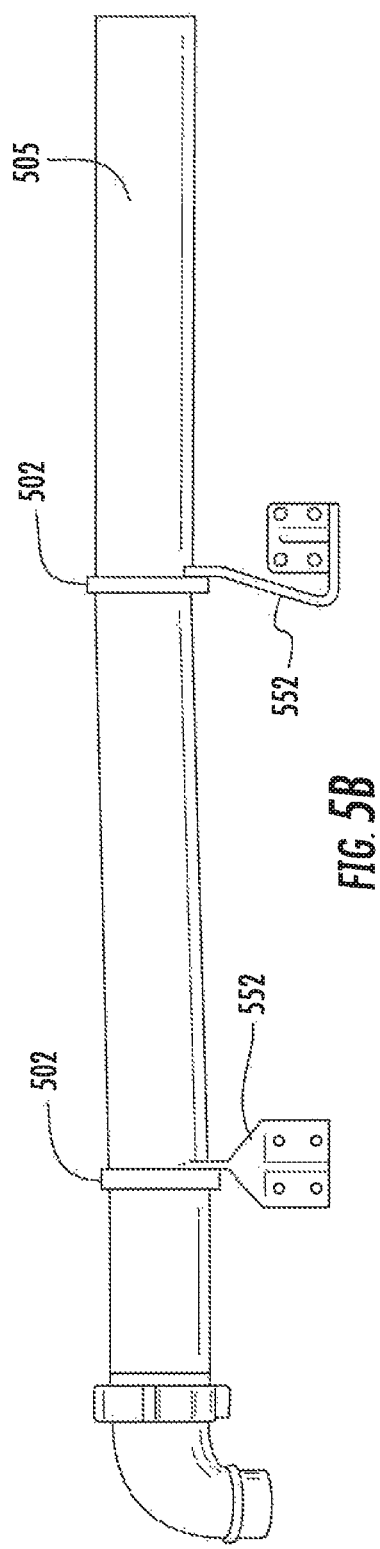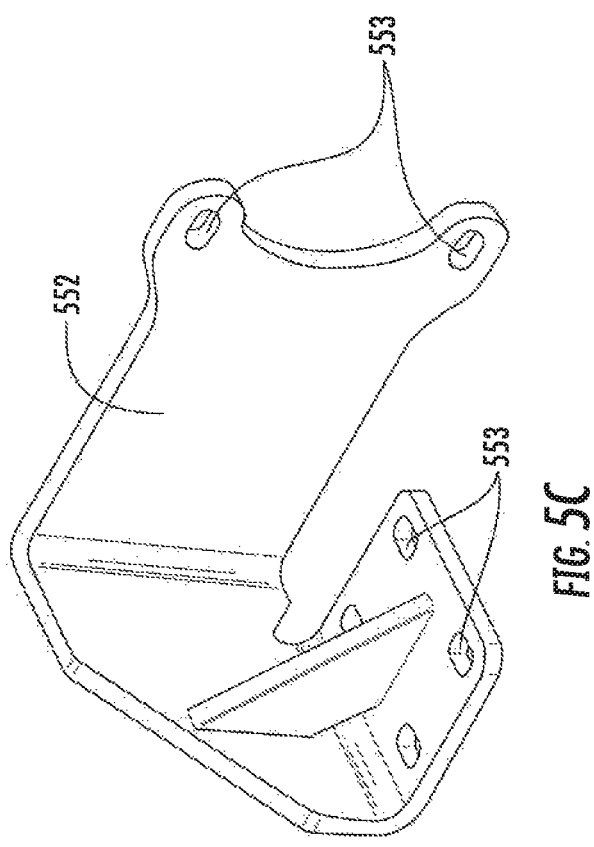

US 10,329,998 B2

METHOD OF SUPPORTING CHARGE AIR TUBES AND MANAGING THERMAL EXPANSION USING A WEAR SLEEVE

CROSS REFERENCE TO RELATED APPLICATIONS

The present application is a National Stage of PCT Application No. PCT/US2015/056183, filed Oct. 19, 2015, which claims the benefit of priority to U.S. Provisional Patent Application No. 62/074,363, filed Nov. 3, 2014. The contents of both applications are herein incorporated by reference in their entirety.

TECHNICAL FIELD

The present disclosure relates to systems and methods for supporting charge air tubes.

BACKGROUND

Internal combustion engines may advantageously incorporate systems such as turbochargers to compress intake air or recirculated exhaust gas. Compression of this gas permits the production of greater power by the engine. However, the compression of such intake or recirculated gases causes an increase in temperature of such gases. The turbocharger is generally coupled to an intake component of the engine via a tube or conduit commonly referred to as a charge air tube. The intake component may include an intake throttle and a charge air cooler configured to cool the compressed gas. The increase in temperature of the compressed gas leaving the turbocharger via the charge air tube causes the temperature of the charge air tube to increase significantly.

Accordingly, during engine operation, the charge tubes, which may also be experiencing significant vibrations from the engine, generally experience a significant amount of thermal expansion, which thermal expansion may cause cracking or fatigue failure in support components of the charge air tubes.

SUMMARY

Various embodiments advantageously provide a charge air tube support assembly comprising a wear sleeve and methods of supporting a charge air tube using a wear sleeve.

Various embodiments provide for an assembly, comprising an internal combustion engine including an intake port, and a charge air cooler coupled to the intake port. A turbocharger including a charge air output port is fluidly coupled to the charge air cooler. A charge air tube is coupled to the charge air output port of the turbocharger. The charge air tube fluidly couples the turbocharger to the charge air cooler for transfer of compressed charge air from the turbocharger to the intake port of the internal combustion engine. A charge air tube support assembly is coupled to the charge air tube. The charge air tube support assembly is configured to allow axial displacement of the charge air tube along an axis of the charge air tube extending from the output port of the turbocharger to the charge air cooler in response to thermal expansion of the charge air tube. The charge air tube support assembly comprises a wear sleeve and a clamp. The wear sleeve is coaxially positioned about the charge air tube. The wear sleeve is formed from non-metallic material. The clamp is coaxially positioned about the wear sleeve and is coupled to the internal combustion engine.

Further embodiments provide for an assembly comprising a charge air tube and a charge air tube assembly. The charge air tube is configured to couple to a charge air output port of a turbocharger. The charge air tube configured to fluidly couple the turbocharger to a charge air cooler for transfer of fluid from the turbocharger to an intake port of an internal combustion engine. The charge air tube support assembly is coupled to the charge air tube and is configured to allow axial displacement of the charge air tube in response to thermal expansion of the charge air tube. The charge air tube support assembly comprises a wear sleeve and a clamp. The wear sleeve is coaxially positioned about the charge air tube. The wear sleeve is formed from non-metallic material. The clamp is coaxially positioned about the wear sleeve and is configured to couple to the internal combustion engine.

The inventors have appreciated that providing a wear element between the hot charge air tubes and the clamps allows the charge air tubes to expand without causing the bending stress on the clamping structure and also provides an isolator between the clamping arrangement & the tubes.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

FIGS. 2A-2F are magnified views of exemplary charge air tube support assemblies coupled to a charge air tube of an internal combustion engine according to various embodiments.

FIGS. 3A-3C are wear sleeves of a charge air tube support assembly, in accordance with example embodiments.

FIGS. 5A-5C are various views of a charge air tube support assembly including a flexible bracket, in accordance with example embodiments.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of, inventive charge air tube support assembly and methods of supporting charge air tubes of turbocharger coupled to an internal combustion engine. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
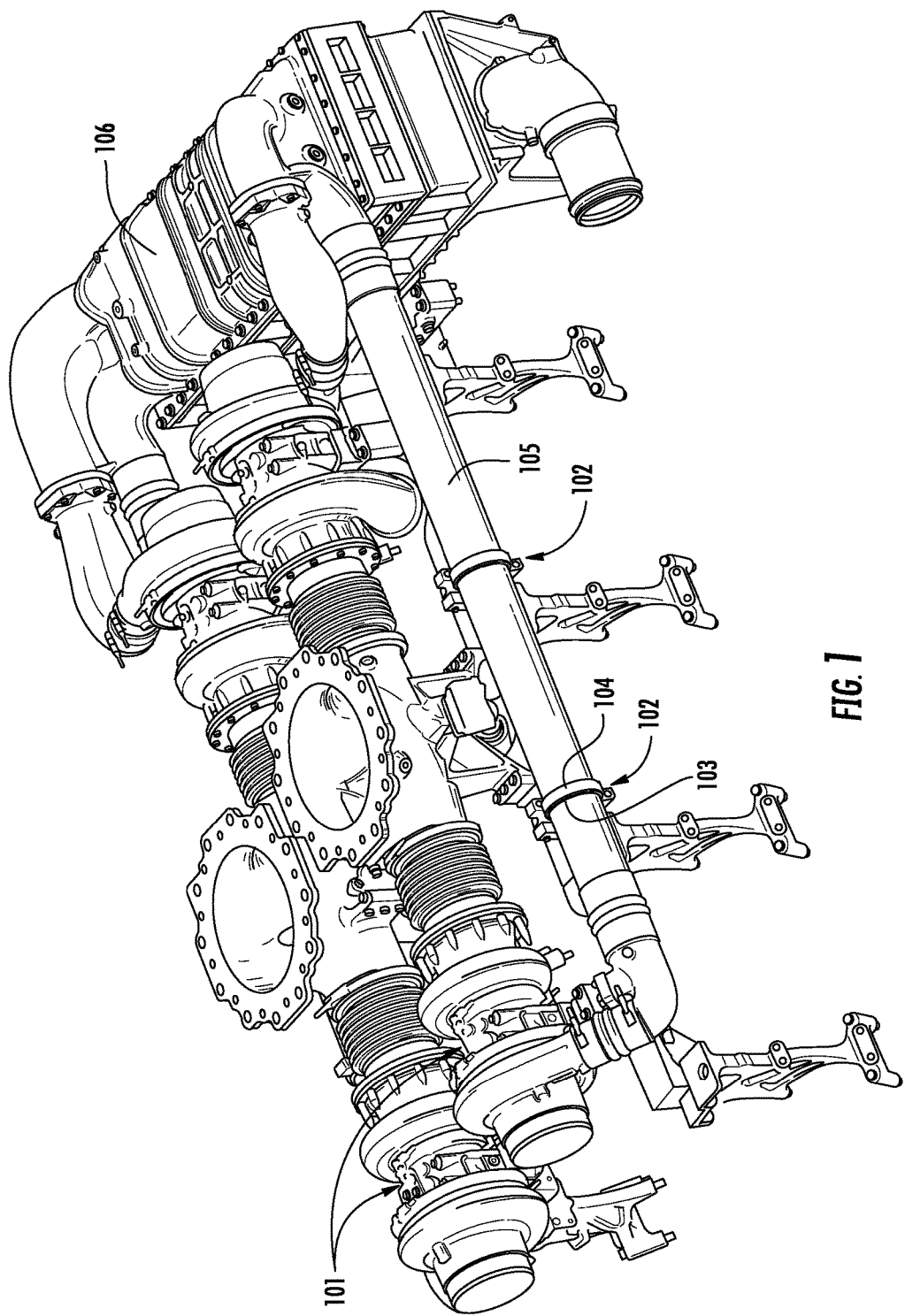
FIG. 1 is an engine assembly including a charge air tube support assembly, in accordance with example embodiments.

FIG. 1 is an engine assembly including a charge air tube support assembly, in accordance with example embodiments. Internal combustion engines, including but not limited to diesel engines, may implement a turbocharger 101 to compress air being received at an intake port in the engine. The compression of the air permits an increased amount of intake air or charge air to be received in the internal combustion engine. The increase in the amount of intake air received in the engine, for example in the combustion chamber of the internal combustion engine, permits the engine to output greater power and may also increase the efficiency of the internal combustion engine. The turbocharger 101 is generally actuated by a turbine that may be driven by exhaust gas from the engine. In example embodiments, the intake air may include recirculated exhaust gas. The output port of the turbocharger 101 is fluidly connected to an input port of the internal combustion engine by a series of components or fluid conduits.

In the embodiment illustrated in FIG. 1, the turbocharger 101 is fluidly coupled to the intake port of the internal combustion engine by a charge air cooler 106 and by a charge air tube 105. The charge air tube 105 provides a fluid conduit for transferring the intake air or charge air compressed by the turbocharger 101 from the turbocharger 101 to the charge air cooler 106. The charge air cooler 106 is used to cool the charge air before the charge air enters the internal combustion engine thereby increasing the density of the charge air. Cooling the charge air also promotes increased efficiency. The charge air cooler may include a cooling fluid or heat transfer fluid flowing through the charge air cooler.

The charge air tube 105 fluidly couples the output port of the turbocharger 101 to the charge air cooler 106. The charge air tube 105 may include a cylindrical tube having a diameter, including, but not limited to, 5 inches. It should be noted, however, that the diameter of the charge air tube 105 is dependent upon the size of the engine. Therefore the size of the charge air tube 105 may vary depending upon the particular implementation. In addition, the charge air tube 105 may be bended, curved, angled, or otherwise appropriately formed in various implementations to couple the turbocharger 101 at one end and the charge air cooler 106 at the other end. The charge air tube 105 may comprise a metallic material including, but not limited to stainless steel. Compression of the charge air by the turbocharger 101 causes an increase in temperature of the charge air, transmitted through the charge air tube 105.

The increase in temperature of the charge air transmitted through the charge air tube 105 causes thermal expansion of the charge air tube 105. In particular, the charge air tube 105 may experience axial thermal expansion along a longitudinal axis of the charge air tube, extending from the output port of the turbocharger to an input port of the charge air cooler 106. Because the charge air tube 105 is operatively connected to the engine, the charge air tube 105 is subjected to vibration as the engine vibrates. To limit the vibration of the charge air tubes, and thereby limit damage to the charge air tubes or prevent separation of the charge air tubes from the turbocharger 101, the charge air cooler 106, or the internal combustion engine, the charge air tubes are generally fastened to the engine by a supporting component. However, rigid coupling of the supporting component to the charge air tube subjects the supporting component to the thermal expansion of the charge air tube, which thermal expansion can cause fatigue or cracking of the support component.

As depicted in FIG. 1, the charge air tube 105 is coupled to the internal combustion engine and supported by charge air tube support assembly 102 configured to accommodate the axial expansion (and contractions) of the charge air tube 105 during operation of the internal combustion and the turbocharger 101. As further demonstrated in FIGS. 2A-2C, the charge air tube support assembly 102 includes a wear sleeve 103 and a clamp 104 coupled thereto.

FIGS. 2A-2C are magnified views of an exemplary charge air tube support assembly coupled to a charge air tube of an internal combustion engine, in accordance with example embodiments. The wear sleeve 103 is coupled to the charge air tube 105 intermediate to a first axial end of the charge air tube (i.e. an end coupled to the turbocharger 101) and a second axial end of the charge air tube (i.e. an end coupled to the charge air cooler 106). The wear sleeve 103 includes a gap 121 separating ends of the wear sleeve 103. The wear sleeve 103 is coaxially positioned about the charge air tube 105. The wear sleeve 103 may be formed as a ring with a single open portion, allowing the ring to be slipped onto the charge air tube 105. However, the wear sleeve may be formed in other manners as well, for example by the use of two substantially semi-annular portions.

The charge air-tube support assembly 102 also includes the clamp 104 coaxially coupled about the wear sleeve 103. The clamp 104 is coupled directly or indirectly to the internal combustion engine. The clamp 104 is configured for tightening via one or more fasteners 122. Tightening the fastener 122 of the clamp 104 causes compression of the wear sleeve 103. The gap 121 of the wear sleeve 103 is selected to maintain separation of the ends of the wear sleeve 103 upon tightening of the clamp 104. In example embodiments, the gap 121 of the wear sleeve 103 may have a distance of 0.07"-0.39" (2 mm-10 mm). In example embodiments, the wear sleeve 103 may have a radial thickness of 0.07"-0.39" (2 mm-10 mm). In example embodiments, the wear sleeve 103 may have an axial thickness of 0.25"-2.00" depending upon the width of the clamp. It should be noted, however, that the dimensions of the gap 121 and the dimensions of the wear sleeve 103 are dependent upon the size of the engine and the size of the charge air tube 105 thereof. Therefore, the dimensions of these components may vary depending upon the particular implementation.

FIGS. 3A-3C depict exemplary wear sleeves of a charge air tube support assembly. FIG. 3A provides a view of a wear sleeve 303 removed from the charge air tube 105. FIG. 3B provides an axial view of the wear sleeve 303 and FIG. 3C provides a radial view of the wear sleeve 303. As illustrated in FIG. 3A, the wear sleeve 303 may include a wear sleeve gap 321 and peripheral ridges 331 extending along the outer edges of the wear sleeve 303 to help retain the position of the clamp 104 with respect to the wear sleeve 303 and prevent the clamp 104 from moving axially with respect to the wear sleeve 303. The wear sleeve 303 is non-metallic (i.e., there is no metallic material contained therein) and comprises a plurality of layers, including one or more fiber layers and one or more rubber layers. The peripheral ridges 331 may be formed from the compression of the non-metallic material of the wear sleeve. In one implementation, the wear sleeve 303 comprises a silicone rubber with reinforced layers of aramid yarn fibers positioned in the wear sleeve 303. Alternatively, the wear sleeve 303 could be formed entirely from high temperature silicone, without aramid fibers included. Other non-metallic materials and material combinations could also be used. The wear sleeve 303 acts as a vibration isolator, but allows axial expansion of the charge air tubes 105 with respect to the wear sleeve 303 as the charge air tubes 105 heat up and expand during operation of the turbocharger 101.

FIG. 2D is a magnified view of an exemplary charge air tube support assembly 250, in accordance with alternative embodiment. The charge air tube support assembly 250 of FIG. 2D is similar in several respects to the charge air tube support assembly of FIGS. 2A-2C. For example, the charge air tube support assembly 250 includes a charge air tube 255 and a clamp 254. Unlike the aforementioned embodiments, however, a wear sleeve 253 (represented in FIG. 2E, showing a cross-sectional view of the charge air tube support assembly 250) is not visible when the charge air tube support assembly 250 is in a fully assembled state. Instead, the wear sleeve 253 is positioned within a void or acceptance region 256 defined by an inner surface of the clamp 254. As shown in FIG. 2E, in this particular implementation the wear sleeve 253 and the clamp 254 may have corresponding angled ends on mating surfaces thereof (shown in FIG. 2F), permitting a more secure fit of the wear sleeve 253 within the clamp 254.

Figure 4A:
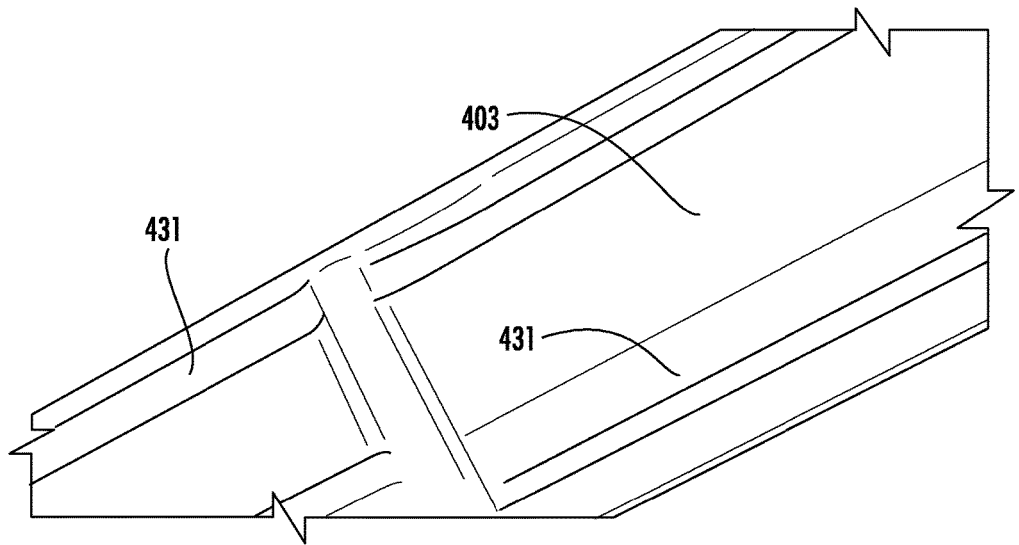
FIGS. 4A-4C are an alternate construction of a wear sleeve of a charge air tube support assembly.
Figure 4B:
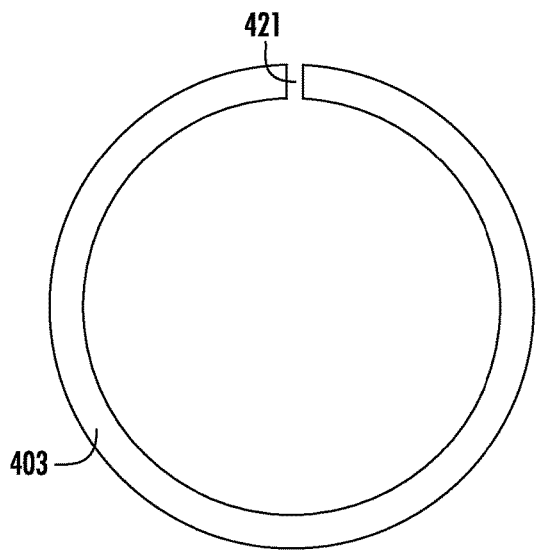
Figure 4C:
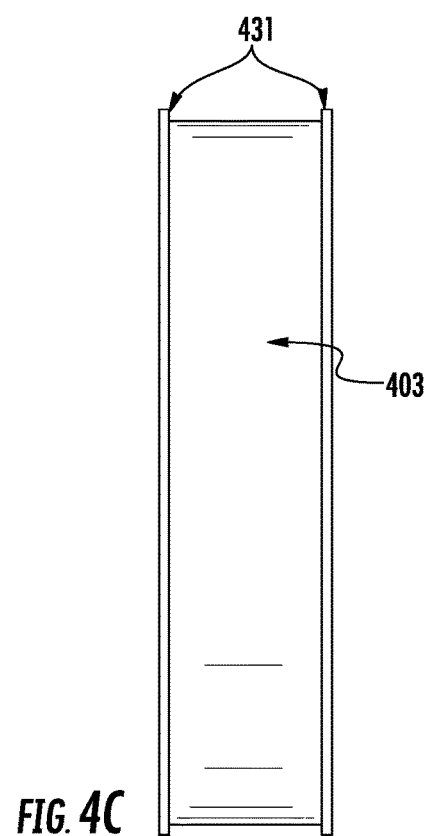

FIGS. 4A-4C show a further alternate construction of a wear sleeve of a charge air tube support assembly. A wear sleeve 403 comprises extruded silicone rubber in a particular embodiment, although other materials could also be used pursuant to design requirements. The wear sleeve 403 maintains a wear sleeve gap 421 and includes peripheral ridges 431 extending along the outer edges of the wear sleeve 403. The peripheral ridges 431 are configured to retain the position of the clamp 104 with respect to the wear sleeve 403 and prevent the clamp 104 from moving axially with respect to the wear sleeve 403.

Figure 5A:
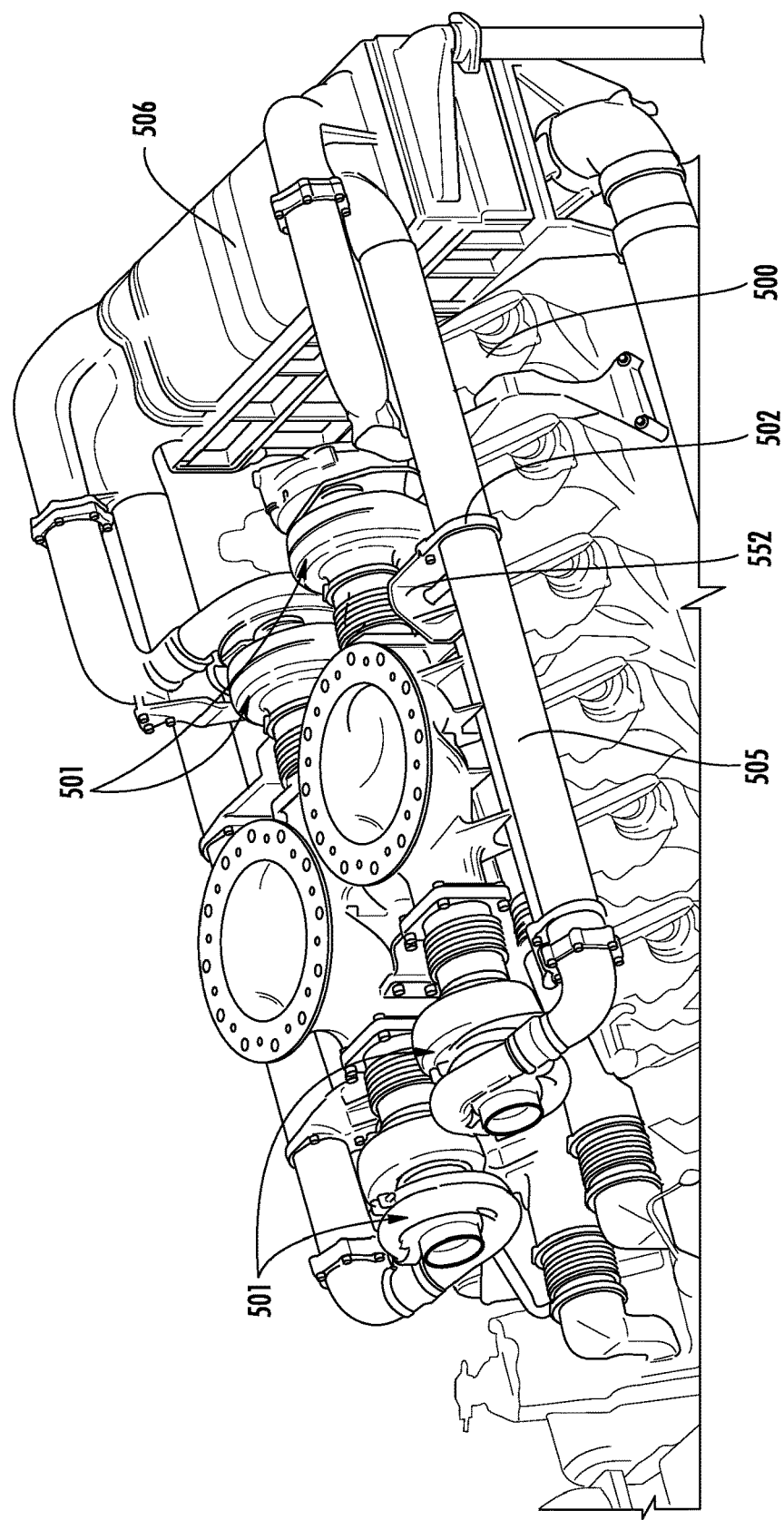

FIGS. 5A-5C are charge air tube support assemblies including a flexible bracket, in accordance with example embodiments. A charge air tube support assembly 502 includes a wear sleeve and a clamp component having a clamp bracket 552 configured to flex along the axis of the charge air tube 505. The charge air tube 505 provides a fluid conduit for transferring the intake air or charge air compressed by the turbocharger 501 from the turbocharger 501 to the charge air cooler 506. The charger air cooler 506 is coupled to an intake port of an internal combustion engine 500. The clamp bracket 552 of the clamp component 504 is coupled to the internal combustion engine 500, for example by one or more fasteners extending through the plurality of fastener apertures 553 in the clamp bracket 552. The clamp bracket 552 is designed to permit bending from the thermal expansion of the charge air tube 505.

For the purpose of this disclosure, the teen "coupled" means the joining of two members directly or indirectly to one another. Such joining may be stationary or moveable in nature. Such joining may be achieved with the two members or the two members and any additional intermediate members being integrally fouled as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only.

Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one."

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. An assembly, comprising:
   an internal combustion engine including an intake port;
   a charge air cooler coupled to the intake port;
   a turbocharger including a charge air output port fluidly coupled to the charge air cooler;
   a charge air tube coupled to the charge air output port of the turbocharger, the charge air tube fluidly coupling the turbocharger to the charge air cooler for transfer of fluid from the turbocharger to the intake port of the internal combustion engine; and
   a charge air tube support assembly coupled to the charge air tube, the charge air tube support assembly configured to allow axial displacement of the charge air tube along an axis of the charge air tube extending from the output port of the turbocharger to the charge air cooler in response to thermal expansion of the charge air tube, the charge air tube support assembly comprising:
      a wear sleeve coaxially positioned about the charge air tube, the wear sleeve formed from non-metallic material, and
      a clamp coaxially positioned about the wear sleeve and coupled to the internal combustion engine;
   wherein both the wear sleeve and the clamp contact the charge air tube.

2. The engine assembly of claim 1, wherein the wear sleeve comprises a plurality of layers.

3. The engine assembly of claim 2, wherein the plurality of layers includes a fiber layer and a rubber layer.

4. The engine assembly of claim 1, wherein the wear sleeve comprises aramid fiber reinforced layers compressed together with silicone rubber.

5. The engine assembly of claim 1, wherein the wear sleeve is formed entirely from silicone rubber.

6. The engine assembly of claim 1, wherein the clamp includes a clamp bracket coupled to the engine, the clamp bracket configured to flex along the axis of the charge air tube.

7. The engine assembly of claim 1, wherein the wear sleeve includes peripheral ridges extending along the outer edges of the wear sleeve, and wherein the clamp is positioned between the peripheral ridges.

8. The engine assembly of claim 1, wherein the charge air tube support assembly is coupled to the charge air support tube intermediate to a first axial end and a second axial end of the charge air tube.

9. The engine assembly of claim 1, wherein the wear sleeve has a wear sleeve width, wherein the clamp has a clamp width, and wherein the wear sleeve width is greater than the clamp width.

10. The engine assembly of claim 1, wherein the wear sleeve is configured to have a coefficient of friction with the charge air tube so as to allow the charge air tube to axially expand with respect to the wear sleeve in response to thermal expansion of the charge air tube.

11. The engine assembly of claim 1, wherein the wear sleeve has a wear sleeve width, wherein the clamp has a clamp width, and wherein the wear sleeve width is less than the clamp width.

12. The engine assembly of claim 11, wherein the wear sleeve is positioned within an acceptance region defined by an inner surface of the clamp.

13. The engine assembly of claim 12, wherein the wear sleeve includes a corresponding mating surface for the inner surface of the acceptance region.

14. The engine assembly of claim 1, wherein the wear sleeve is formed as an incomplete ring including a gap.

15. The engine assembly of claim 1, wherein the wear sleeve is formed as a plurality of separate semi-annular portions.

16. An assembly, comprising:
   a charge air tube configured to couple to a charge air output port of a turbocharger, the charge air tube configured to fluidly couple the turbocharger to a charge air cooler for transfer of fluid from the turbocharger to an intake port of an internal combustion engine; and
   a charge air tube support assembly coupled to the charge air tube, the charge air tube support assembly configured to allow axial displacement of the charge air tube in response to thermal expansion of the charge air tube, the charge air tube support assembly comprising:
      a wear sleeve coaxially positioned about the charge air tube, the wear sleeve formed from non-metallic material, and
      a clamp coaxially positioned about the wear sleeve and configured to couple to the internal combustion engine;
   wherein both the wear sleeve and the clamp contact the charge air tube.

17. The assembly of claim 16, wherein the wear sleeve comprises a plurality of layers.

18. The assembly of claim 17, wherein the plurality of layers includes a fiber layer and a rubber layer.

19. The assembly of claim 16, wherein the wear sleeve comprises aramid fiber reinforced layers compressed together with silicone rubber.

20. The assembly of claim 16, wherein the wear sleeve is formed entirely from silicone rubber.

21. The assembly of claim 16, wherein the clamp includes a clamp bracket coupled to the engine, the clamp bracket configured to flex along the axis of the charge air tube.

22. The assembly of claim 16, wherein the wear sleeve includes peripheral ridges extending along the outer edges of the wear sleeve, and wherein the clamp is positioned between the peripheral ridges.

23. The assembly of claim 16, wherein the wear sleeve has a wear sleeve width and the clamp has a clamp width, wherein the wear sleeve width is less than the clamp width, wherein the wear sleeve is positioned within an acceptance region defined by an inner surface of the clamp, and wherein the wear sleeve includes a corresponding mating surface for the inner surface of the acceptance region.

24. The assembly of claim 16, wherein the wear sleeve is formed as an incomplete ring including a gap.

25. The assembly of claim 16, wherein the wear sleeve is formed as a plurality of separate semi-annular portions.

* * * * *